US012759811B2

(12) United States Patent
Miyazaki

(10) Patent No.: US 12,759,811 B2
(45) Date of Patent: Oct. 13, 2026

(54) PRODUCTION SYSTEM

(71) Applicant: FANUC CORPORATION, Yamanashi (JP)

(72) Inventor: Wataru Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 210 days.

(21) Appl. No.: 18/254,763

(22) PCT Filed: Nov. 24, 2021

(86) PCT No.: PCT/JP2021/042932
§ 371 (c)(1),
(2) Date: May 26, 2023

(87) PCT Pub. No.: WO2022/118704
PCT Pub. Date: Jun. 9, 2022

(65) Prior Publication Data

US 2024/0300750 A1    Sep. 12, 2024

(30) Foreign Application Priority Data

Dec. 1, 2020 (JP) ................................. 2020-199361

(51) Int. Cl.
*B25J 9/00* (2006.01)
*B65G 47/90* (2006.01)

(52) U.S. Cl.
CPC .......... *B65G 47/905* (2013.01); *B25J 9/0093* (2013.01)

(58) Field of Classification Search
CPC ............................. B25J 9/0093; B65G 47/905
See application file for complete search history.

(56) References Cited

U.S. PATENT DOCUMENTS 8,973,916 B2 * 3/2015 Takada .................. G07D 11/22 250/559.15
10,647,528 B1 * 5/2020 Diankov ................ B65G 47/90
(Continued)

FOREIGN PATENT DOCUMENTS

DE 69032185 T2 10/1998
DE 102009060271 A1 6/2011
(Continued)

OTHER PUBLICATIONS

International Search Report issued in PCT/JP2021/042932; mailed Jan. 25, 2022.

*Primary Examiner* — Gerald McClain
(74) *Attorney, Agent, or Firm* — Studebaker Brackett PLLC

(57) ABSTRACT

This production system comprises a workpiece transport device that transports a workpiece, a robot, and a robot movement device, the production system being such that when the workpiece is transported, the robot is moved and performs an operation while following the workpiece, wherein the production system has a determination unit that, while the robot is moving so as to follow the workpiece, determines whether the position of the workpiece relative to the robot has exceeded an operable range in which the robot can operate on the workpiece, and a position correction unit that, when it is determined by the determination unit that the position of the workpiece relative to the robot has exceeded the operable range, controls driving of the workpiece transport device and/or the robot movement device to correct the position so that the position of the workpiece relative to the robot enters the operable range.

3 Claims, 9 Drawing Sheets

(56) References Cited

U.S. PATENT DOCUMENTS

| | | | | |
|---|---|---|---|---|
| 10,696,493 | B1 * | 6/2020 | Diankov | B65G 61/00 |
| 10,696,494 | B1 * | 6/2020 | Diankov | B65G 61/00 |
| 12,489,010 | B2 * | 12/2025 | Shirako | H10P 72/0454 |
| 2018/0001469 | A1 * | 1/2018 | Ooba | B25J 9/0093 |
| 2020/0095001 | A1 * | 3/2020 | Menon | B25J 9/0093 |
| 2020/0254617 | A1 * | 8/2020 | Aldridge | B25J 9/1612 |
| 2022/0348409 | A1 * | 11/2022 | Sun | B65G 1/1371 |
| 2024/0181653 | A1 * | 6/2024 | Miyazaki | B25J 5/02 |
| 2024/0359324 | A1 * | 10/2024 | Huang | B25J 9/162 |
| 2024/0383139 | A1 * | 11/2024 | Douglas | G06Q 10/087 |

FOREIGN PATENT DOCUMENTS

| | | | |
|---|---|---|---|
| EP | 1633534 | B1 | 9/2018 |
| JP | S62-203789 | A | 9/1987 |
| JP | H02-031219 | U | 2/1990 |
| JP | H08-072764 | A | 3/1996 |
| JP | 2000-025664 | A | 1/2000 |
| JP | 2006-159399 | A | 6/2006 |

* cited by examiner

PRODUCTION SYSTEM

TECHNICAL FIELD

The present invention relates to a production system.

BACKGROUND ART

There is known a production system including a workpiece transfer device that transfers a workpiece, a robot, and a robot moving device that moves the robot along the workpiece transfer device (for example, see Patent Document 1). In such a production system, when the workpiece is being transferred by the workpiece transfer device, the robot moving device moves the robot at the same speed as the workpiece in synchronization with the transfer of the workpiece. The robot performs predetermined work on the workpiece while following the workpiece.

Patent Document 1: Japanese Unexamined Patent Application, Publication No. H8-72764

DISCLOSURE OF THE INVENTION

Problems to be Solved by the Invention

The robot has a prescribed operable range in which the robot can work on the workpiece. Therefore, the robot moving device needs to move the robot such that the position of the workpiece relative to the robot will not exceed the operable range of the robot when making the robot follow the workpiece being transferred.

A transfer speed of the workpiece is measured in a predetermined cycle. The robot moving device moves the robot at a speed corresponding to the transfer speed based on the measured value of the transfer speed of the workpiece. For this reason, the position of the workpiece relative to the robot does not exceed the operable range of the robot during a normal operation.

However, when the measured value of the transfer speed of the workpiece is not transmitted to the robot moving device due to some unexpected trouble or when the transfer speed of the workpiece changes rapidly within a period shorter than a measurement cycle, there is a case where the robot moving device cannot make the robot properly follow the workpiece and the position of the workpiece relative to the robot exceeds the operable range of the robot.

Therefore, it is desirable to provide a production system in which a robot can move to follow the workpiece such that a position of a workpiece relative to the robot is prevented or hindered from exceeding an operable range of the robot.

Means for Solving the Problems

An aspect of the present disclosure is directed to a production system including: a workpiece transfer device that transfers a workpiece; a robot; and a robot moving device that moves the robot. The production system is configured such that while the workpiece is being transferred by the workpiece transfer device, the robot moving device moves the robot and the robot performs an operation while following the workpiece, and includes: a determination unit that determines whether a position of the workpiece relative to the robot has exceeded an operable range in which the robot is capable of working on the workpiece while the robot is moving to follow the workpiece; and a position compensation unit that, in a case where the determination unit determines that the position of the workpiece relative to the robot has exceeded the operable range, performs position compensation by controlling at least one of driving of the workpiece transfer device or driving of the robot moving device such that the position of the workpiece relative to the robot becomes within the operable range.

Effects of the Invention

According to an aspect, it is possible to provide a production system in which a robot can move to follow a workpiece such that a position of the workpiece relative to the robot is prevented or hindered from exceeding an operable range of the robot.

PREFERRED MODE FOR CARRYING OUT THE INVENTION

Figure 1:
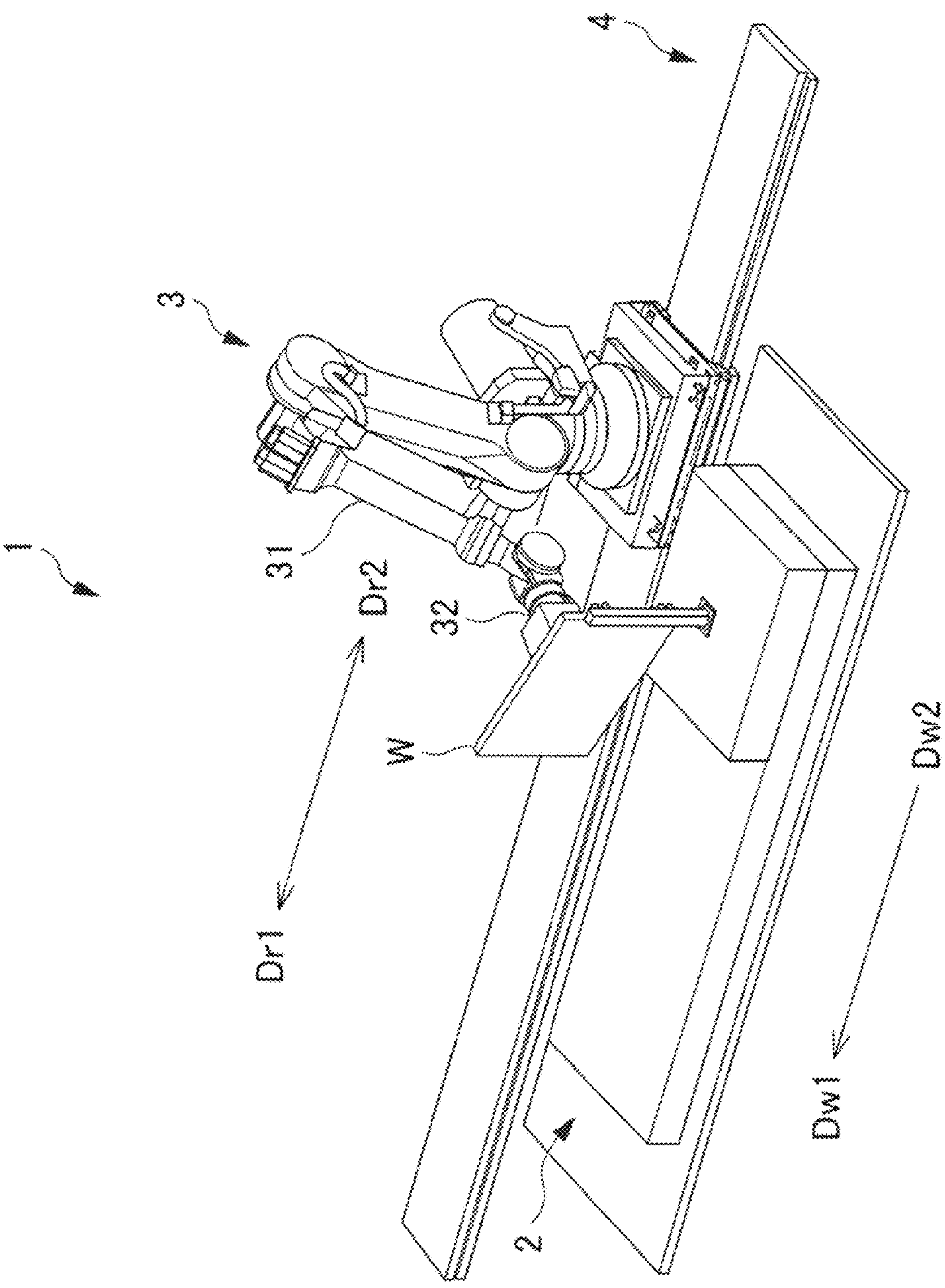
FIG. 1 is a diagram showing an outline of a production system.
Figure 2:
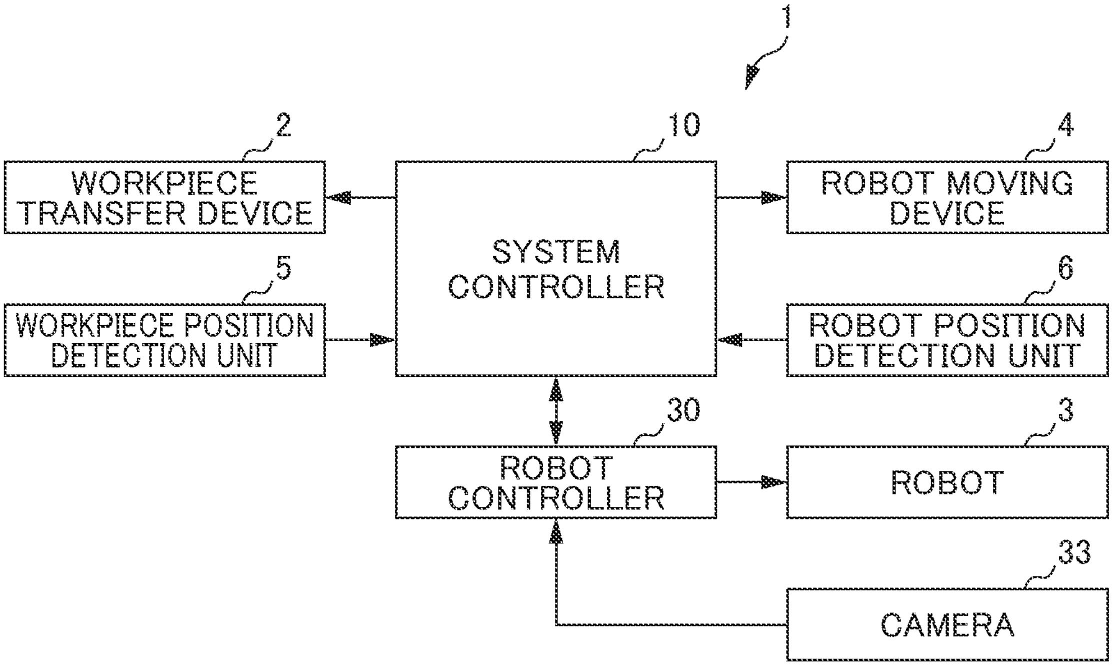
FIG. 2 is a block diagram showing a configuration of the production system.
Figure 3:
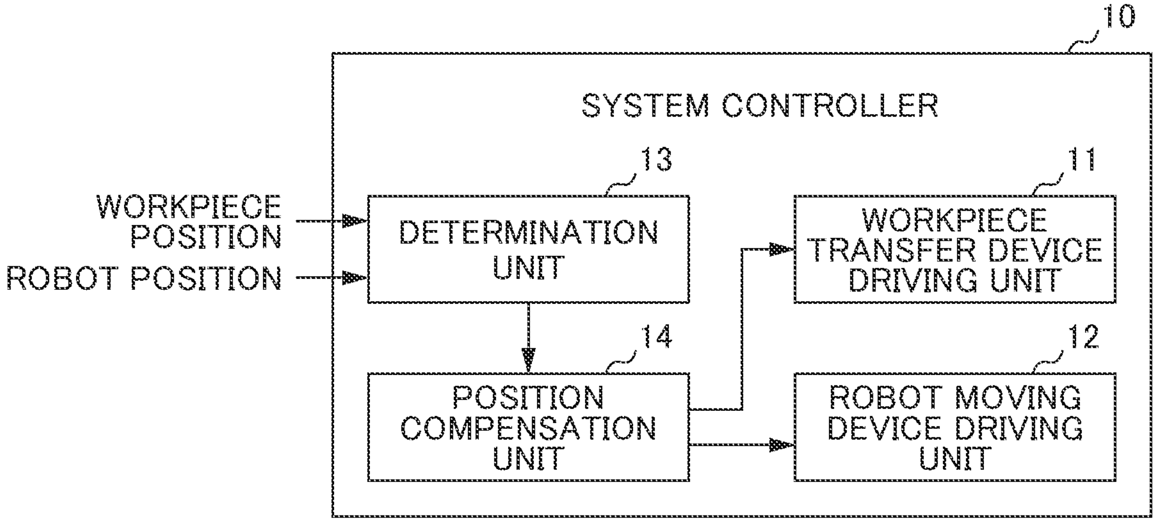
FIG. 3 is a block diagram showing a configuration of a system controller in the production system.

Embodiments of the present disclosure will be described below with reference to the drawings. In FIGS. 1 to 3, a production system 1 includes a workpiece transfer device 2 that transfers a workpiece W, a robot 3, and a robot moving device 4 that moves the robot 3. The workpiece W is a target on which the robot 3 performs work. The workpiece transfer device 2 and the robot moving device 4 configure a production line in the production system 1.

The workpiece transfer device 2 is, for example, a conveyor, and is driven and controlled by a system controller 10 shown in FIG. 2. The workpiece transfer device 2 linearly moves the workpiece W placed on a top in a direction of Dw1-Dw2. The workpiece transfer device 2 can bidirectionally transfer workpiece W between the Dw1 direction (forward direction) and the Dw2 direction (backward direction).

A position of the workpiece W placed on the workpiece transfer device 2 is detected by a workpiece position detection unit 5 shown in FIG. 2. The workpiece position detection unit 5 is configured by a linear encoder, for example. Information on the position of the workpiece W detected by the workpiece position detection unit 5 is output to the system controller 10. The system controller 10 measures a transfer speed of the workpiece W from the position information of the workpiece W every prescribed cycle time.

The robot 3 is driven and controlled by a robot controller 30 shown in FIG. 2. The robot 3 is, for example, a vertical multi-joint robot including a plurality of movable portions.

The robot 3 has a hand portion 32 at a tip of an arm portion 31 to perform a predetermined work for the workpiece W. The robot 3 freely moves the hand portion 32 by performing a turning motion on the robot moving device 4 and making the arm portion 31 stretchable.

A camera 33 shown in FIG. 2 is attached to the hand portion 32. Image data captured by the camera 33 is sent to the robot controller 30. The robot controller 30 performs a visual feedback based on the image captured by the camera 33. The robot controller 30 performs pattern matching using a model taught in a workable posture in the visual feedback, and controls the robot 3 to operate the robot 3 such that the detection result approaches the model position at the time of teaching. Thus, the robot 3 performs a predetermined work on the workpiece W using the hand portion 32 within a prescribed operable range.

The robot moving device 4 is driven and controlled by the system controller 10. The robot moving device 4 linearly moves the robot 3 placed on the top in a Dr1-Dr2 direction along a rail, for example. The robot moving device 4 moves the robot 3 at a speed corresponding to the transfer speed of the workpiece W measured by the system controller 10. The Dr1-Dr2 direction is, for example, a direction parallel to the Dw1-Dw2 direction which is the transfer direction of the workpiece W described above. The robot moving device 4 can bidirectionally move the robot 3 between the Dr1 direction (forward direction) and the Dr2 direction (backward direction).

The position of the robot 3 on the robot moving device 4 is detected by a robot position detection unit 6 shown in FIG. 2. The robot position detection unit 6 is configured by a linear encoder, for example. Information on the position of the robot 3 detected by the robot position detection unit 6 is output to the system controller 10.

Figure 4:
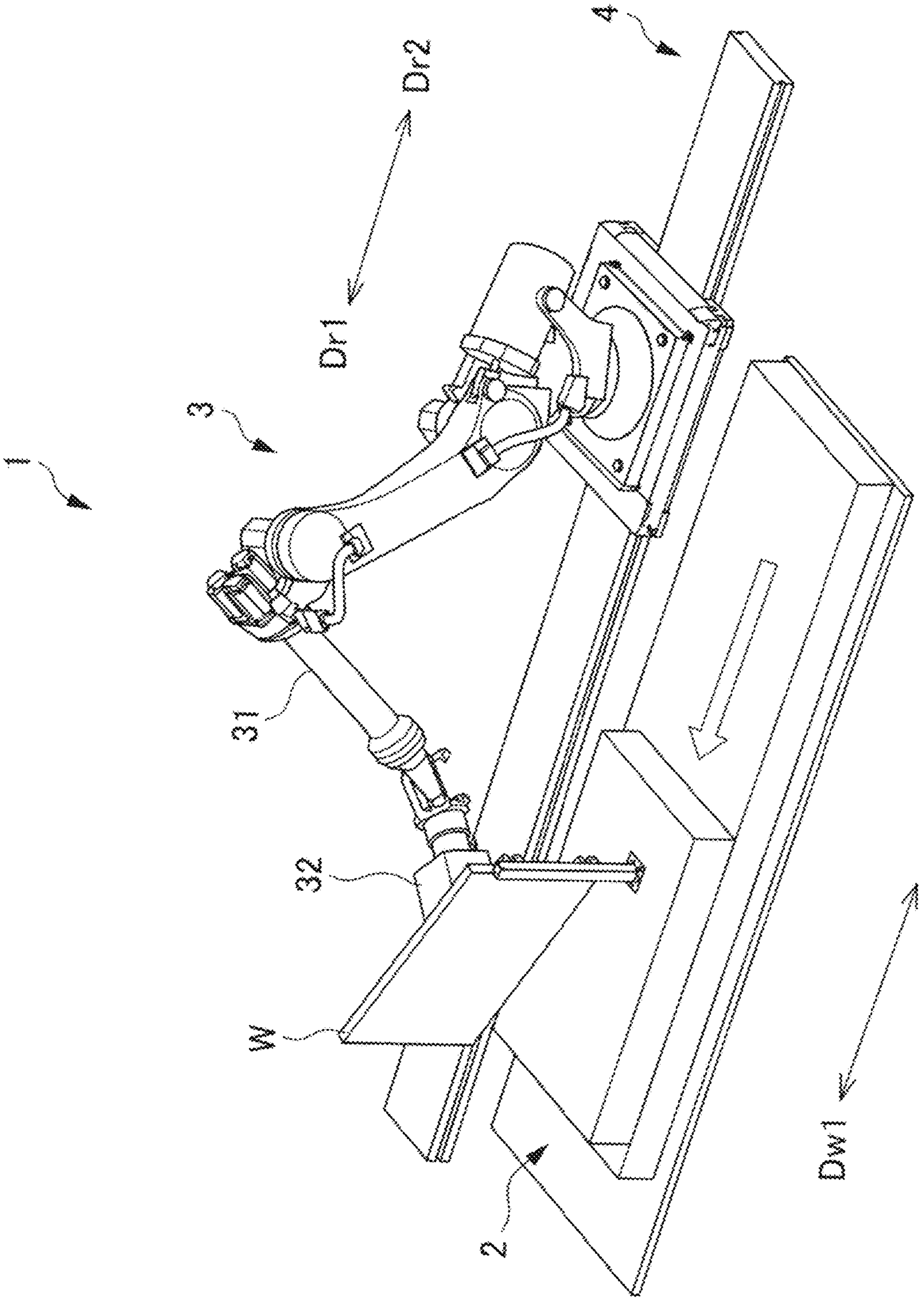
FIG. 4 is a diagram illustrating a state where a robot performs a work while following a workpiece.

The system controller 10 shown in FIGS. 2 and 3 controls the overall operation of the production system 1. As shown in FIG. 4, the system controller 10 drives the workpiece transfer device 2 and transfers the workpiece W in the Dw1 direction at a predetermined speed. While transferring the workpiece W, the system controller 10 drives the robot moving device 4 and moves the robot 3 in the Dr1 direction following the workpiece W. At this time, the robot moving device 4 moves the robot 3 at a speed corresponding to the transfer speed of the workpiece W such that the position of the workpiece W relative to the robot 3 is continuously within the prescribed operable range of the robot 3. The system controller 10 drives the robot 3 using the robot controller 30 during movement of the robot 3. Thus, the robot 3 performs a predetermined work for the workpiece W with the hand portion 32 while moving to follow the workpiece W.

As shown in FIG. 3, the system controller 10 includes a workpiece transfer device driving unit 11, a robot moving device driving unit 12, a determination unit 13, and a position compensation unit 14. The workpiece transfer device driving unit 11 drives the workpiece transfer device 2. The robot moving device driving unit 12 drives the robot moving device 4.

The determination unit 13 inputs the workpiece position detected by the workpiece position detection unit 5 and the robot position detected by the robot position detection unit 6 when the robot 3 moves following the workpiece W. The determination unit 13 previously stores, in a storage unit (not shown), information on the prescribed operable range where the robot 3 can work for the workpiece W. Specifically, the information on the operable range is, for example, information indicating that the robot 3 is operable when how far the workpiece W is separated from the robot 3. In consideration of stability of the work, the operable range is usually set in a narrower range than a limit range where the robot 3 cannot completely work.

The determination unit 13 measures a relative position between the workpiece W and the robot 3 from the workpiece position and the robot position which are input, and determines whether the position of the workpiece W relative to the robot 3 has exceeded the prescribed operable range where the robot 3 can perform the work for the workpiece W. The determination of the determination unit 13 is executed by a predetermined cycle time shorter than the cycle time at which the transfer speed of the workpiece W is measured from the position information of the workpiece W detected by the workpiece position detection unit 5. When determining that the position of the workpiece W relative to the robot 3 has exceeded the operable range, the determination unit 13 outputs a signal indicating the fact to the position compensation unit 14.

When the determination unit 13 determines that the position of the workpiece W relative to the robot 3 has exceeded the operable range of the robot 3, the position compensation unit 14 performs position compensation by controlling at least one of the driving of the workpiece transfer device 2 or the driving of the robot moving device 4 such that the position of the workpiece W relative to the robot 3 becomes within the operable range of the robot 3.

Figure 5:
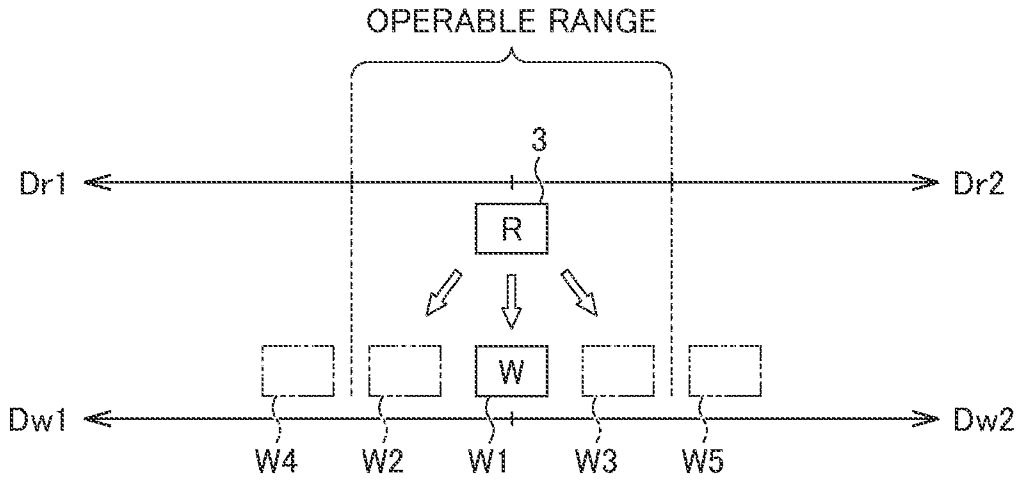
FIG. 5 is a diagram illustrating an embodiment of an operable range of a robot with respect to a workpiece.

More specifically, as shown in FIG. 5, the robot 3 moving in the Dr1 direction following the workpiece W being transferred in the Dw1 direction has an operable range with a predetermined width. When the robot 3 being moved maintains an appropriate position with respect to the workpiece W being transferred and follows the workpiece W, the workpiece W being transferred is within the operable range of the robot 3. The robot 3 can work on the workpiece W regardless of whether the workpiece W is at the position of W1, W2, or W3 as long as the workpiece W is within the operable range. However, when the workpiece W being transferred is at the position W4 or W5 beyond the operable range of the robot 3 being moved, the robot 3 may not be able to work on the workpiece W.

When receiving the signal indicating the fact of exceeding the operable range from the determination unit 13, the position compensation unit 14 controls at least one of the driving of the workpiece transfer device 2 or the driving of the robot moving device 4 according to the current positions of the workpiece W and the robot 3.

Specifically, for example, when the workpiece W relative to the robot 3 is at the position W4 that is ahead of the robot 3 in the Dw1 direction as shown in FIG. 5, the position compensation unit 14 performs any of the following controls such that the workpiece W will be positioned within the operable range of the robot 3.

(1) Control only the workpiece transfer device driving unit 11 so as to reduce the transfer speed of the workpiece W by the workpiece transfer device 2.

(2) Control only the workpiece transfer device driving unit 11 so as to reverse the transfer direction of the workpiece W in the Dw2 direction by the workpiece transfer device 2 and move by a distance specified in advance.

(3) Control only the robot moving device driving unit 12 so as to increase the moving speed of the robot 3 by the robot moving device 4.

(4) Control the workpiece transfer device driving unit 11 so as to reduce the transfer speed of the workpiece W by the workpiece transfer device 2, and control the robot moving device driving unit 12 so as to increase the moving speed of the robot 3 by the robot moving device 4.

On the other hand, for example, when the workpiece W relative to the robot 3 is at the position W5 that is retreated from the robot 3 in the Dw2 direction as shown in FIG. 5, the position compensation unit 14 performs any of the following controls such that the workpiece W will be positioned within the operable range of the robot 3.

(5) Control only the workpiece transfer device driving unit 11 so as to increase the transfer speed of the workpiece W by the workpiece transfer device 2.

(6) Control only the robot moving device driving unit 12 so as to reverse the moving direction of the robot 3 in the Dr2 direction by the robot moving device 4 and move by a distance specified in advance.

(7) Control only the robot moving device driving unit 12 so as to increase the moving speed of the robot 3 by the robot moving device 4.

(8) Control the workpiece transfer device driving unit 11 so as to increase the transfer speed of the workpiece W by the workpiece transfer device 2, and control the robot moving device driving unit 12 so as to reduce the moving speed of the robot 3 by the robot moving device 4.

The transfer speed and the transfer direction of the workpiece W by the workpiece transfer device 2 affect productivity of the production system 1. Therefore, when the position compensation unit 14 performs control such that the workpiece W will be positioned within the operable range of the robot 3, it is preferable to perform the control of (3), (4), (6), (7), and (8) among the control (1) to (8) described above, and it is more preferable to perform the control of (3), (6), and (7) for controlling only the robot moving device 4.

Figure 6:
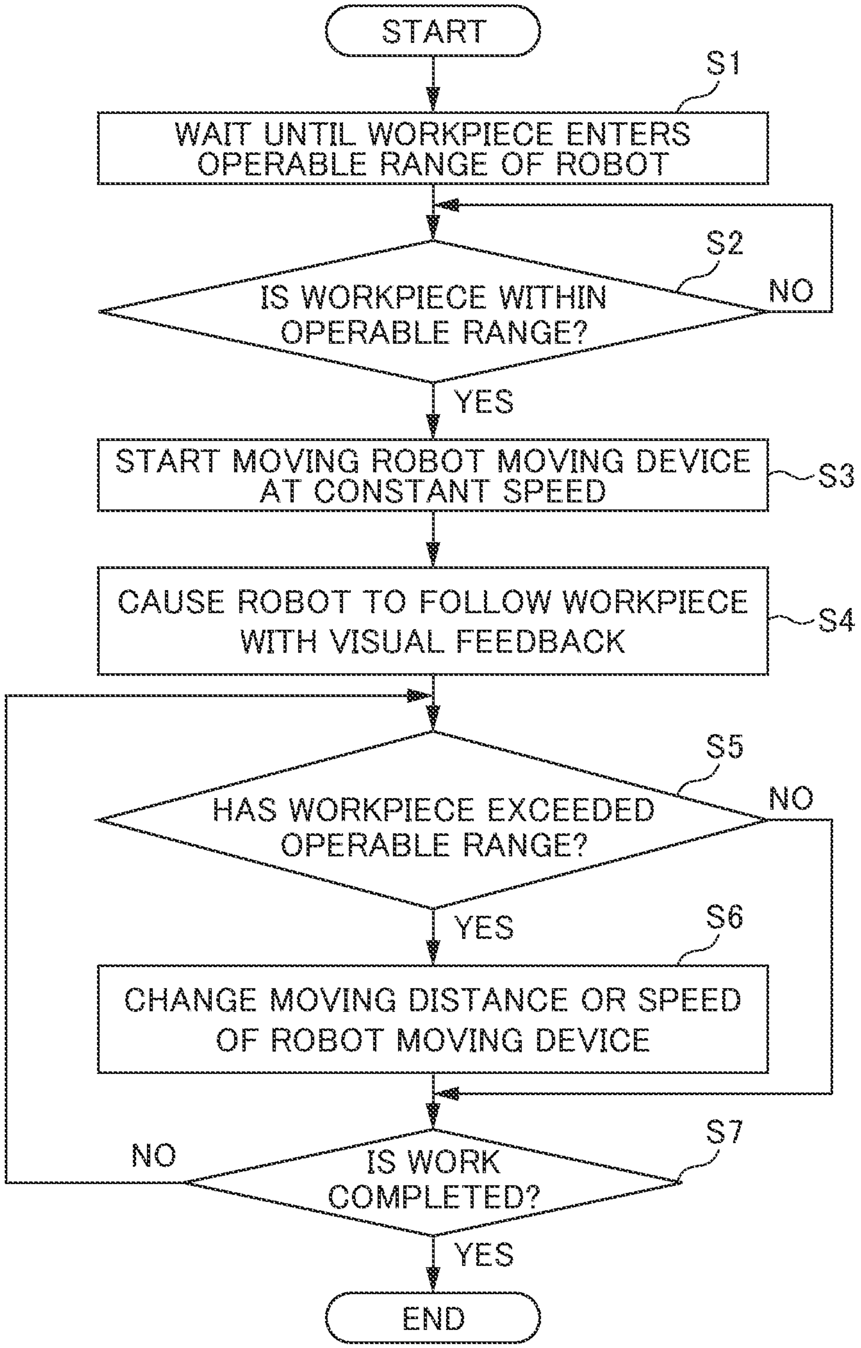
FIG. 6 is a flowchart illustrating an embodiment of an operation of the production system.

A specific operation of the production system 1 will be described below with reference to a flowchart shown in FIG. 6.

The robot 3 is at a predetermined initial position of a work start on the robot moving device 4. After the production system 1 starts to operate, the system controller 10 controls the workpiece transfer device driving unit 11 to drive the workpiece transfer device 2 and advance the workpiece W in the Dw1 direction at a preset constant transfer speed. The system controller 10 causes the workpiece position detection unit 5 to monitor whether the workpiece W has entered the work area of the robot 3. The system controller 10 waits until the workpiece W enters the work area of the robot 3 (Step S1, NO in Step S2).

When it is detected that the workpiece W has entered the work area of the robot 3 (YES in Step S2), the system controller 10 controls the robot moving device driving unit 12 to drive the robot moving device 4. Thus, the system controller 10 advances the robot 3 in the Dr1 direction at a preset constant moving speed, and moves the robot 3 following the workpiece W (Step S3).

Thereafter, the system controller 10 outputs a work start command to the robot controller 30 as the robot 3 starts moving. Thus, the robot controller 30 drives the robot 3 according to a predetermined work program. The robot controller 30 drives the arm portion 31 and the hand portion 32 by a visual feedback based on the image captured by the camera 33 attached to the hand portion 32 of the robot 3, and executes a predetermined work on the workpiece W while following the workpiece W (Step S4).

During the movement of the robot 3 following the workpiece W, the system controller 10 causes the determination unit 13 to determine, based on the workpiece position and the robot position input from the workpiece position detection unit 5 and the robot position detection unit 6, whether the position of the workpiece W relative to the robot 3 has exceeded the operable range in which the robot 3 can work on the workpiece W (Step S5). When it is determined that the position of the workpiece W relative to the robot 3 has not exceeded the operable range (NO in Step S5), the system controller 10 determines whether the work of the robot 3 on the workpiece W is completed (Step S7). The system controller 10 returns the process to Step S5 when the work is not completed (NO in Step S7), and finishes the work of the robot 3 on the workpiece w when the work is completed (YES in Step S7).

When it is determined in Step S5 that the position of the workpiece W relative to the robot 3 has exceeded the operable range (YES in Step S5), the system controller 10 causes the position compensation unit 14 to control at least one of the driving of the workpiece transfer device 2 or the driving of the robot moving device 4 and to perform position compensation such that the position of the workpiece W relative to the robot 3 becomes within the operable range (Step S6). In the flowchart shown in FIG. 6, the position compensation unit 14 controls the robot moving device driving unit 12 to change the moving distance or the speed of the robot moving device 4, thereby performing position compensation.

Figure 7:
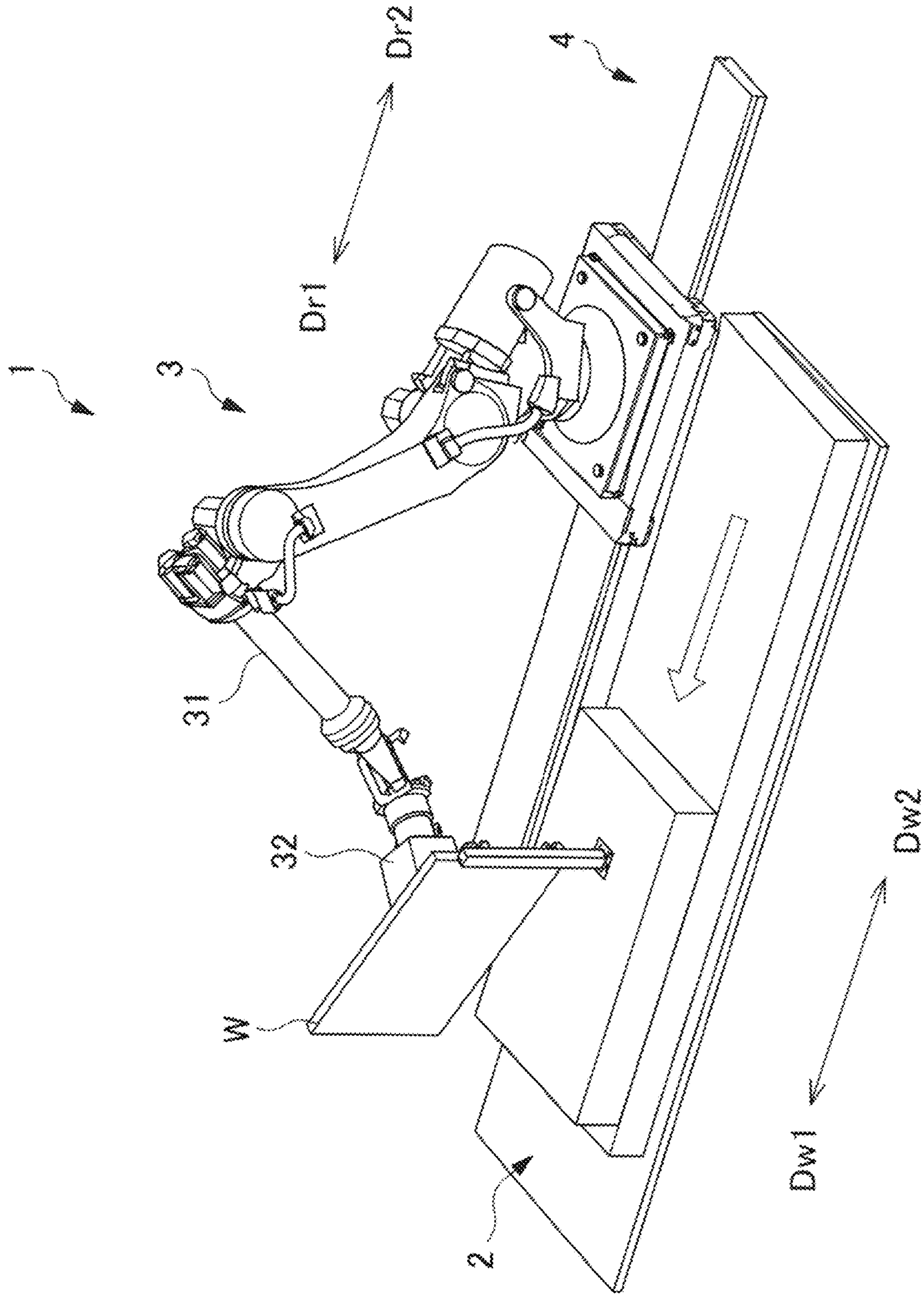
FIG. 7 is a diagram illustrating a state where position compensation is performed such that a position of a workpiece relative to a robot becomes within an operable range of the robot.

For example, when the workpiece W relative to the robot 3 is at the position W4 that is ahead of the robot 3 in the Dw1 direction as shown in FIG. 5, the position compensation unit 14 controls the robot moving device driving unit 12 to drive the robot moving device 4 such that the speed of the robot 3 is increased to a prescribed speed as shown in FIG. 7. Further, when the workpiece W relative to the robot 3 is at the position W5 that is retreated from the robot 3 in the Dw2 direction as shown in FIG. 5, the position compensation unit 14 controls the robot moving device driving unit 12 to drive the robot moving device 4 such that the robot 3 is moved backward by a prescribed distance in the Dr2 direction. After the position compensation, the process proceeds to Step S7, and the system controller 10 determines whether the work is completed.

The prescribed speed and the prescribed distance are set and stored in advance in the position compensation unit 14, for example. Such speed and distance are not limited to one value. A plurality of speed and distance values may be set according to a separation distance of the workpiece W from the robot 3. In this case, the position compensation unit 14 can perform the position compensation by selecting the optimum speed and distance values that bring the position of the workpiece W within the operable range of the robot 3 according to the separation distance of the workpiece W from the robot 3.

As described above, the production system 1 according to the present embodiment includes the workpiece transfer device 2 that transfers the workpiece W, the robot 3, and the robot moving device 4 that moves the robot 3, the production system 1 being configured such that while the workpiece W is being transferred by the workpiece transfer device 2, the robot moving device 4 moves the robot 3 and the robot 3 performs the operation while following the workpiece W. The production system includes: the determination unit 13 that determines whether the position of the workpiece W relative to the robot 3 has exceeded the operable range in which the robot 3 can perform work on the workpiece W while the robot 3 is moving to follow the workpiece W; and the position compensation unit 14 that, in a case where the determination unit 13 determines that the position of the workpiece W relative to the robot 3 has exceeded the operable range, performs the position compensation by controlling at least one of the driving of the workpiece transfer device 2 or the driving of the robot moving device 4 such that the position of the workpiece W relative to the robot 3 becomes within the operable range. Thus, the robot 3 can be moved to follow the workpiece W such that the position of the workpiece W relative to the robot 3 is prevented or hindered from exceeding the operable range of the robot 3. Therefore, the machining accuracy and productivity of the workpiece W in the production system 1 are improved.

In a case where the position compensation unit 14 performs the position compensation by moving at least one of the workpiece transfer device 2 or the robot moving device 4 by a prescribed distance, the position compensation can be simply performed by the movement of at least one of the workpiece W or the robot 3.

In a case where the position compensation unit 14 performs the position compensation by changing at least one of the speed of the workpiece transfer device 2 or the speed of the robot moving device 4, the position compensation can be quickly performed by the movement of at least one of the workpiece W or the robot 3.

Figure 8:
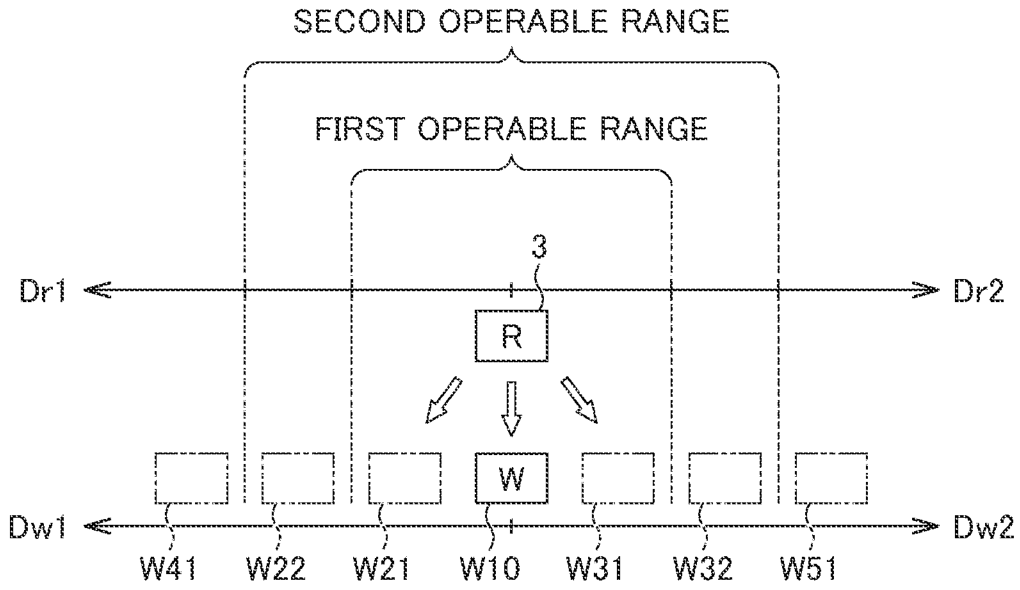
FIG. 8 is a diagram illustrating another embodiment of an operable range of a robot with respect to a workpiece.

The operable range of the robot 3 determined by the determination unit 13 is not limited to the single range shown in FIG. 5, and may include at least two ranges: a first operable range and a second operable range wider than the first operable range as shown in FIG. 8. In this case, according to the production system 1, the operable range includes at least two ranges, i.e., the first operable range and the second operable range wider than the first operable range, and the position compensation unit 14 controls at least one of the driving of the workpiece transfer device 2 or the driving of the robot moving device 4 to perform first position compensation such that the position of the workpiece W relative to the robot 3 is within the first operable range when the determination unit 13 determines that the position of the workpiece W relative to the robot 3 has exceeded the first operable range, and controls at least one of the driving of the workpiece transfer device 2 or the driving of the robot moving device 4 to perform second position compensation with a larger amount of compensation than the first position compensation such that the position of the workpiece W relative to the robot 3 becomes within the first operable range when the determination unit 13 determines that the position of the workpiece W relative to the robot 3 has exceeded the second operable range.

The first operable range is a range in which the robot 3 can stably work on the workpiece W with a margin. For example, when the workpiece W is at positions W10, W21, and W31 shown in FIG. 8, the robot 3 can stably work on the workpiece W with a margin. The second operable range is a range in which the robot 3 can work on the workpiece W, but the work efficiency of the robot 3 may be lower than in the first operable range. When the workpiece W exceeds the second operable range, it may be difficult or not possible for the robot 3 to perform appropriate work on the workpiece W due to a stroke limit, for example. The operable range is not limited to be set to two operable ranges, and may be set to three or more operable ranges.

When the position of the workpiece W relative to the robot 3 is at a position W22 advanced in the Dw1 direction from the robot 3 shown in FIG. 8, since the workpiece W has exceeded the first operable range of the robot 3, the position compensation unit 14 performs the first position compensation by any control of (1) to (4) described above such that the workpiece W is positioned within the first operable range of the robot 3.

On the other hand, even when the position of the workpiece W relative to the robot 3 is at a position W32 retreated in the Dw2 direction from the robot 3 shown in FIG. 8, since the workpiece W has exceeded the first operable range of the robot 3, the position compensation unit 14 performs the first position compensation by any control of (5) to (8) described above such that the workpiece W is positioned within the first operable range of the robot 3.

Further, when the position of the workpiece W relative to the robot 3 is at a position W41 further advanced in the Dw1 direction from the robot 3 shown in FIG. 8, since the workpiece W has exceeded the second operable range of the robot 3, the position compensation unit 14 performs the second position compensation by any control of (1) to (4) described above such that the workpiece W is positioned within the first operable range of the robot 3.

Furthermore, when the position of the workpiece W relative to the robot 3 is at a position W51 further retreated in the Dw2 direction from the robot 3 shown in FIG. 8, since the workpiece W has exceeded the second operable range of the robot 3, the position compensation unit 14 performs the second position compensation by any control of (5) to (8) described above such that the workpiece W is positioned within the first operable range of the robot 3.

The second position compensation has a larger amount of compensation than the first position compensation.

Specifically, when a parameter for position compensation is a distance, a compensation distance due to the second position compensation has a larger value than a compensation distance due to the first position compensation. When a parameter for position compensation is a speed, the amount of change in a compensation speed due to the second position compensation has a larger value than the amount of change in a compensation speed due to the first position compensation.

Figure 9:
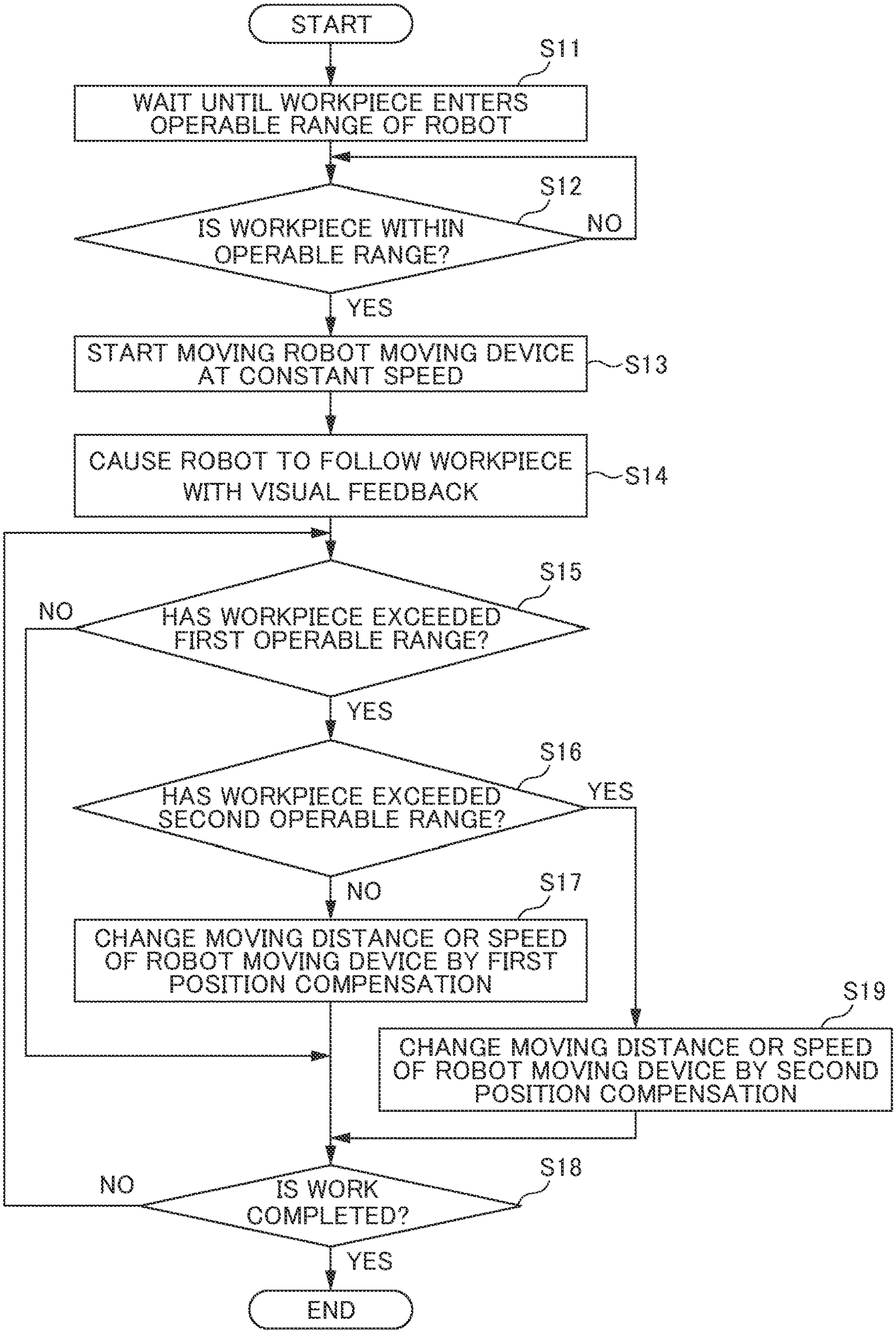
FIG. 9 is a flowchart illustrating another embodiment of an operation of the production system.

Next, a description will be given with reference to a flowchart shown in FIG. 9 with respect to a specific operation of the production system 1 in which the operable range of the robot 3 is set to two ranges of the first operable range and the second operable range.

The robot 3 is at a predetermined initial position of a work start on the robot moving device 4. After the production system 1 starts to operate, the system controller 10 controls the workpiece transfer device driving unit 11 to drive the workpiece transfer device 2 and advance the workpiece W in the Dw1 direction at a preset constant transfer speed. The system controller 10 causes the workpiece position detection unit 5 to monitor whether the workpiece W has entered the work area of the robot 3. The system controller 10 waits until the workpiece W enters the work area of the robot 3 (Step S11, NO in Step S12).

When it is detected that the workpiece W has entered the work area of the robot 3 (YES in Step S12), the system controller 10 controls the robot moving device driving unit 12 to drive the robot moving device 4. Thus, the system controller 10 advances the robot 3 in the Dr1 direction at a preset constant moving speed, and moves the robot 3 following the workpiece W (Step S13).

Thereafter, the system controller 10 outputs a work start command to the robot controller 30 as the robot 3 starts moving. Thus, the robot controller 30 drives the robot 3 according to a predetermined work program. The robot controller 30 drives the arm portion 31 and the hand portion 32 by a visual feedback based on the image captured by the camera 33 attached to the hand portion 32 of the robot 3, and executes a predetermined work on the workpiece W while following the workpiece W (Step S14).

During the movement of the robot 3 following the workpiece W, the system controller 10 causes the determination unit 13 to determine, based on the workpiece position and the robot position input from the workpiece position detection unit 5 and the robot position detection unit 6, whether the position of the workpiece W relative to the robot 3 has exceeded the first operable range in which the robot 3 can work on the workpiece W (Step S15). When it is determined that the position of the workpiece W relative to the robot 3 has not exceeded the first operable range (NO in Step S15), the system controller 10 determines whether the work of the robot 3 on the workpiece W is completed (Step S18). The system controller 10 returns the process to Step S15 when the work is not completed (NO in Step S18), and finishes the work of the robot 3 on the workpiece W when the work is completed (YES in Step S18).

When it is determined in Step S15 described above that the position of the workpiece W relative to the robot 3 has exceeded the first operable range (YES in Step S15), then the system controller 10 causes the determination unit 13 to determine whether the position of the workpiece W relative to the robot 3 has exceeded the second operable range in which the robot 3 can work on the workpiece W (Step S16).

When it is determined in Step S16 described above that the position of the workpiece W relative to the robot 3 has not exceeded the second operable range (NO in Step S16), the position compensation unit 14 controls at least one of the driving of the workpiece transfer device 2 or the driving of the robot moving device 4 to perform the first position compensation such that the position of the workpiece W relative to the robot 3 becomes within the first operable range (Step S17). In the flowchart shown in FIG. 9, the position compensation unit 14 controls the robot moving device driving unit 12 to change the moving distance or the speed of the robot moving device 4, thereby performing the first position compensation.

When it is determined in Step S16 described above that the position of the workpiece W relative to the robot 3 has exceeded the second operable range (YES in Step S16), the position compensation unit 14 controls at least one of the driving of the workpiece transfer device 2 or the driving of the robot moving device 4 to perform the second position compensation having the larger amount of compensation than the first position compensation such that the position of the workpiece W relative to the robot 3 becomes within the first operable range (Step S19). In the flowchart shown in FIG. 9, the position compensation unit 14 controls the robot moving device driving unit 12 to change the moving distance or the speed of the robot moving device 4, thereby performing the second position compensation.

After the first position compensation in Step S17 and after the second position compensation in Step S19, the process proceeds to Step S18, and the system controller 10 determines whether the work is completed.

In this way, the operable range determined by the determination unit 13 has at least two ranges of the first operable range and the second operable range wider than the first operable range, whereby the robot 3 can always work on the workpiece W in a better posture. Therefore, the machining accuracy and productivity of the workpiece W in the production system 1 are further improved.

EXPLANATION OF REFERENCE NUMERALS

1: Production system
2: Workpiece transfer device
3: Robot
4: Robot moving device
13: Determination unit
14: Position compensation unit
W: Workpiece

The invention claimed is:

1. A production system comprising:
a workpiece transfer device that transfers a workpiece;
a robot;
a rail on which the robot is placed;
a robot moving device that moves the robot along the rail; and
a system controller comprising a processor configured to function such that while the workpiece is being transferred by the workpiece transfer device, the robot moving device moves the robot along the rail and the robot performs an operation while following the workpiece,
wherein the processor is configured to:
determine whether a position of the workpiece relative to the robot has exceeded an operable range in which the robot is capable of performing work on the workpiece while the robot is moving along the rail to follow the workpiece; and
perform, in a case of determining that the position of the workpiece relative to the robot has exceeded the operable range, position compensation by controlling at least one of driving of the workpiece transfer device or driving of the robot moving device such that the position of the workpiece relative to the robot becomes within the operable range,
the operable range comprises at least two ranges including a first operable range and a second operable range that is larger than the first operable range, and
the processor sets a larger amount of position compensation in a case of determining that the position of the workpiece relative to the robot has exceeded the second operable range than in a case of determining that the position of the workpiece relative to the robot has exceeded the first operable range.

2. The production system according to claim 1, wherein the is configured to perform the position compensation by moving at least one of the workpiece transfer device or the robot moving device by a prescribed distance.

3. The production system according to claim 1, wherein the processor is configured perform the position compensation by changing at least one of a speed of the workpiece transfer device or a speed of the robot moving device.

* * * * *